United States Patent
Maeda

(10) Patent No.: US 6,195,954 B1
(45) Date of Patent: Mar. 6, 2001

(54) METHOD OF IMPROVING DURABILITY OF A BUILDING, BUILDING, FAR-INFRARED RADIATION THERMAL STORAGE FLOOR HEATING SYSTEM, AND METHOD OF IMPROVING SOIL OF BUILDING LOT

(75) Inventor: Isamu Maeda, Tokyo (JP)

(73) Assignee: Scandanavia Home Co. Ltd., Tokyo (JP)

( * ) Notice: Subject to any disclaimer, the term of this patent is extended or adjusted under 35 U.S.C. 154(b) by 0 days.

(21) Appl. No.: 09/174,972

(22) Filed: Oct. 19, 1998

(30) Foreign Application Priority Data

Apr. 1, 1998 (JP) .................................................. 10-088603
Apr. 10, 1998 (JP) .................................................. 10-099676

(51) Int. Cl.⁷ ....................................................... E04H 1/02
(52) U.S. Cl. ....................................... 52/741.1; 52/309.4
(58) Field of Search ................................ 52/220.1, 309.4, 52/741.1, 741.11–741.15; 405/38, 50, 55; 165/53

(56) References Cited

U.S. PATENT DOCUMENTS

4,084,363 * 4/1978 Moore ................................ 52/309.4
5,310,280 * 5/1994 Hara ...................................... 405/38
5,542,603 * 8/1996 Macduff ................................. 165/53

FOREIGN PATENT DOCUMENTS

| 02 132189 | 5/1990 | (JP) . |
| 07 106057 | 4/1995 | (JP) . |
| 08 158392 | 6/1996 | (JP) . |
| 09144342 | 6/1997 | (JP) . |
| 10 002568 | 1/1998 | (JP) . |
| 11 071582 | 3/1999 | (JP) . |

* cited by examiner

Primary Examiner—Richard Chilcot

(57) ABSTRACT

A fill layer containing a ceramic/carbon mixture is provided under an entire surface of a floor. A crushed stone layer including the ceramic/carbon mixture is provided on the top surface of the fill layer. A concrete layer containing the ceramic/carbon mixture is provided on the top surface of the crushed stone layer. A thermally-insulating, moisture-proofing layer, which is formed of an extrusion-foamed styrene and a moisture-proofing film is provided on the top surface of the concrete layer. A mortar layer including the ceramic/carbon mixture is provided on the thermally-insulating, moisture-proofing layer. A hot water pipe or an electric heater is embedded in the mortar layer, and a finishing material is laid on the surface of the mortar layer. Far-infrared radiation is emitted from the ceramic/carbon mixture, and the heating efficiency can be improved by stored heat.

9 Claims, 3 Drawing Sheets

METHOD OF IMPROVING DURABILITY OF A BUILDING, BUILDING, FAR-INFRARED RADIATION THERMAL STORAGE FLOOR HEATING SYSTEM, AND METHOD OF IMPROVING SOIL OF BUILDING LOT

BACKGROUND OF THE INVENTION

1. Field of the Invention

The present invention relates to a method of improving durability of a building, a building, a far-infrared radiation thermal storage floor heating system, and a method of improving the soil of a building lot. In particular, the present invention relates to a method of improving the durability of a building and a building in which the durability of the building which is a house or the like is improved, to a far-infrared radiation thermal storage floor heating system in which the heating efficiency is improved, and to a method of improving the soil of a building lot in which the soil of a building lot is improved.

2. Description of the Related Art

The natural environment has been deteriorating seriously. Such deterioration is present in a variety of forms such as air pollution, water pollution, pollution of foodstuffs due to agricultural chemicals, and the like.

With buildings as well, new construction materials are used, and chemicals such as pesticides for exterminating termites, formalin, and the like are used therein. The soil beneath the floor of a building becomes acidic due to such chemicals and due to the cement within concrete. Further, the durability of buildings such as houses and the like deteriorates due to the effects of the moisture of the soil.

Further, a thermal storage floor heating system using an electric heating source has been proposed in which a hot water pipe is embedded in the slab-on-earth, and hot water is circulated in the hot water pipe.

With the floor heating system, the air within the living space is not mixed, and therefore, this system is more healthy than a heating system using an air conditioner which mixes the air within the living space.

SUMMARY OF THE INVENTION

An object of the present invention is to provide a method of improving the durability of a building and a building having improved durability which do not result in any of the above-described drawbacks.

Another object of the present invention is to provide a far-infrared radiation thermal storage floor heating system which is an improvement on the above-described floor heating system and which results in improved heating efficiency.

Yet another object of the present invention is to provide a method of improving the soil of a building lot which improves the properties of the soil of a building lot (i.e., which improves the soil quality).

In order to achieve the above described objects, in the method for improving durability of a building of the present invention, a ceramic/carbon mixture, in which ceramic and carbon are mixed together, is included in each of a fill layer, a crushed stone layer provided on the fill layer, a slab-on-earth layer provided on the crushed stone layer, and a mortar layer provided on the slab-on-earth layer.

In the method for improving durability of a building of the present invention, each of a fill layer, a crushed (or broken) stone layer, a slab-on-earth layer, and a mortar layer includes a ceramic/carbon mixture in which ceramic and carbon are mixed together. In the case of an existing structure, the soil beneath the floor is dug up, and a fill layer, a crushed stone layer, a slab-on-earth layer, and a mortar layer, each containing the ceramic/carbon mixture, are backfilled. In a new building, a fill layer, a crushed stone layer, a slab-on-earth layer, and a mortar layer, each containing the ceramic/carbon mixture, are formed, and when the concrete foundation is being laid, the ceramic/carbon mixture may be included in the foundation as well.

The ceramic/carbon mixture has high far-infrared radiation emitting energy. By mixing the ceramic/carbon mixture in the fill layer, the crushed stone layer, the slab-on-earth layer, and the mortar layer, moisture within the structure and the walls of the building can be removed and condensation can be prevented due to the emission of far-infrared radiation from the floor. Therefore, the durability of the building, can be improved by such moisture-proofing.

Further, the ceramic/carbon mixture has the effect of making weakly alkaline the soil which has acidified due to cement or chemicals. This, together with the moisture-proofing effect, suppresses outbreaks of termites and of bacteria and fungi, which also leads to an improvement in the durability of the building.

The far-infrared radiation emitting effect of the ceramic/carbon mixture is strengthened when the ceramic/carbon mixture is heated. Therefore, it is preferable to provide a heat source to heat the ceramic/carbon mixture.

The building of the present invention comprises: a pillar made of wood whose distal end portion is tapered and whose lower end portion is buried in the ground; a crystal sphere inserted in the lower end portion of said pillar; a ceramic/carbon/gravel mixture which is formed by mixing ceramic, carbon and gravel together and which is provided at the periphery of the lower end portion of said pillar; a floor member containing a ceramic/carbon mixture in which ceramic and carbon are mixed together; and a heat source for heating said floor member and said ceramic/carbon/gravel mixture which is provided at the periphery of the lower end portion of said pillar.

The floor member may be formed by a fill layer, a crushed stone layer provided on the fill layer, a slab-on-earth layer provided on the crushed stone layer, and a mortar layer provided on the slab-on-earth layer.

Because the pillar of the building of the present invention is made of wood, the main component thereof is carbon. Further, the lower end portion of the pillar is buried in the ground, and the ceramic/carbon/gravel mixture is disposed at the periphery of the lower end portion. Therefore, the electric potential in a vicinity of the lower end portion of the pillar is high due to the effect of the carbon in the mixture. Because the distal end portion of the pillar is tapered (pointed), it is easy for electrical energy within the atmosphere to collect thereat. Further, because a crystal sphere having a high current collecting effect is inserted into the lower end portion of the pillar, the electrical energy in the atmosphere flows from the distal end portion toward the lower end portion of the pillar.

Because the lower end portion of the pillar is buried in the ground, the pillar is affected by terrestrial magnetism, and the magnetic energy flows from the lower end portion to the distal end portion of the pillar. At this time, far-infrared radiation is emitted from the ceramic and the carbon of the ceramic/carbon/gravel mixture provided at the periphery of the lower end portion of the pillar, so as to regulate the magnetic field.

In the building of the present invention, because the ceramic/carbon/gravel mixture and the floor member containing the ceramic/carbon mixture are heated by the heat source, the far-infrared radiation emitting effect is increased even more.

As described above, due to the far-infrared radiation from the floor which is emitted from the ceramic/carbon mixture, moisture within the structure and within the walls of the building is removed, condensation is prevented, and the soil is made weakly alkaline by the ceramic/carbon mixture. This works together with the moisture-proofing effect to suppress outbreaks of termites and outbreaks of bacteria and fungi, and the durability of the building can thereby be improved.

The wood pillar in the building of the present invention creates the feel of a Japanese building, and provides a living space with a Japanese architectural sense.

The far-infrared radiation thermal storage floor heating system of the present invention comprises: a floor member containing a ceramic/carbon mixture in which ceramic and carbon are mixed together; and a heat source embedded in said floor member.

The floor member may be formed by a fill layer, a crushed stone layer provided on the fill layer, a slab-on-earth layer provided on the crushed stone layer, and a mortar layer provided on the slab-on-earth layer.

The heat source may be hot water circulating in the pipe embedded in the floor member, or may be a heater such as an electric heater, a semiconductor heater, or the like.

In the far-infrared radiation thermal storage floor heating system of the present invention, heating is carried out by a heat source heating the floor member which includes the ceramic/carbon mixture in which ceramic and carbon are mixed together. As described above, the far-infrared radiation emitting energy of the ceramic/carbon mixture is high, and becomes even higher when the ceramic/carbon mixture is used in combination with a heat source. Therefore, because persons within the building can be thoroughly warmed by the emission of the far-infrared radiation, the heating efficiency can be improved. Further, because far-infrared radiation is good for blood circulation, good health is promoted.

Because the floor member is formed by the fill layer, the crushed stone layer, the slab-on-earth layer, and the mortar layer, even in cases in which heating of the respective layers by the heat source is stopped, the heat storing effect and the far-infrared radiation emitting effect of the ceramic/carbon mixture work together such that energy-efficient floor heating can be realized. Further, the cooling effect is also strong due to the dehumidifying effect of the far-infrared radiation.

In order to achieve the above-described object, the method of improving the soil of a building lot of the present invention comprises the steps of: including a ceramic/carbon mixture, in which ceramic and carbon are mixed together, in each of a fill layer, a crushed stone layer provided on the fill layer, a slab-on-earth layer provided on the crushed stone layer, and a mortar layer provided on the slab-on-earth layer; and disposing in a building lot a ceramic/carbon/gravel mixture in which ceramic, carbon and gravel are mixed together.

As described above, by emitting far-infrared radiation, the ceramic/carbon mixture has the effect of weakly alkalinizing the soil which has become acidic due to cement or chemicals. Therefore, by including the ceramic/carbon mixture in the fill layer, the crushed stone layer, the slab-on-earth layer, and the mortar layer and by backfilling a ceramic/carbon/gravel mixture in the building lot, the properties of the soil of the building lot, i.e., the soil quality, can be improved.

Because the far-infrared radiation emitting effect of the ceramic/carbon mixture is strengthened when the ceramic/carbon mixture is heated, it is effective to embed a heat source in at least one of the slab-on-earth layer which contains the ceramic/carbon mixture, the mortar layer, and the ceramic/carbon/gravel mixture, and to heat the ceramic/carbon mixture and the ceramic/carbon/gravel mixture.

It is easy for electrical energy in the atmosphere to collect at the wood pillar whose distal end portion is tapered. Therefore, the effect of improving the soil is even further improved by erecting a wooden pillar with a tapered distal end portion, e.g., a central pillar, such that the lower end portion of the pillar is buried in the ceramic/carbon/gravel mixture.

It is preferable to use a charcoal such as bincho charcoal (a high-quality charcoal from Wakayama Prefecture, Japan) as the carbon in the ceramic/carbon/gravel mixture and in the ceramic/carbon mixture. It is preferable to use pumice (in particular, a pumice from Niijima Island, Japan called "kokaseki" in Japanese), which is a far-infrared radiation emitting ceramic, as the ceramic. Further, a mixture in which powdered charcoal, rough charcoal (charcoal which is crushed roughly) and pumice are mixed in a ratio of 1:2:3 can be used as the ceramic/carbon mixture. For the ceramic/carbon/gravel mixture, a mixture in which the gravel, on the one hand, and a ceramic/carbon mixture, on the other hand, are mixed in a ratio of 2:3 may be used.

In this way, by mixing the ceramic and carbon, high far-infrared radiation which is neutralized by the synergistic effect can be emitted.

As described above, in the method of improving durability of a building of the present invention, a ceramic/carbon mixture, which has high far-infrared radiation emitting energy, is mixed in each of the fill layer, the crushed stone layer, the slab-on-earth layer, and the mortar layer. Therefore, due to the emission of far-infrared radiation from beneath the floor, the moisture within the structure and within the walls of the building can be removed, condensation can be prevented, and the soil can be turned weakly alkaline. Therefore, the outbreak of termites and the outbreak of bacteria and fungi can be suppressed, and the durability of the building can thereby be improved.

In the building of the present invention, a ceramic/carbon/bincho charcoal/gravel mixture is filled in at the lower end portion of the wooden pillar. Further, the floor member contains a ceramic/carbon mixture, and a ceramic/carbon/gravel mixture and the floor member are heated by a heat source. Therefore, the effect of emitting negative ions and far-infrared radiation is further improved, and the durability of the building is further improved.

The far-infrared radiation thermal storage floor heating system of the present invention uses the ceramic/carbon mixture which has high far-infrared radiation emitting energy. Therefore, the heating efficiency can be improved.

DESCRIPTION OF THE PREFERRED EMBODIMENTS

Hereinafter, an embodiment of the present invention will be described in detail with reference to the figures. The present invention may be applied to a newly-constructed building such as an apartment building, a regular building, a house or the like, or to a renovation of or an addition to an existing building. The following embodiment is a case in which the present invention is applied to a newly-constructed house. Further, in the present embodiment, a house, which is a walled structure, is combined with a central pillar.

Figure 1:
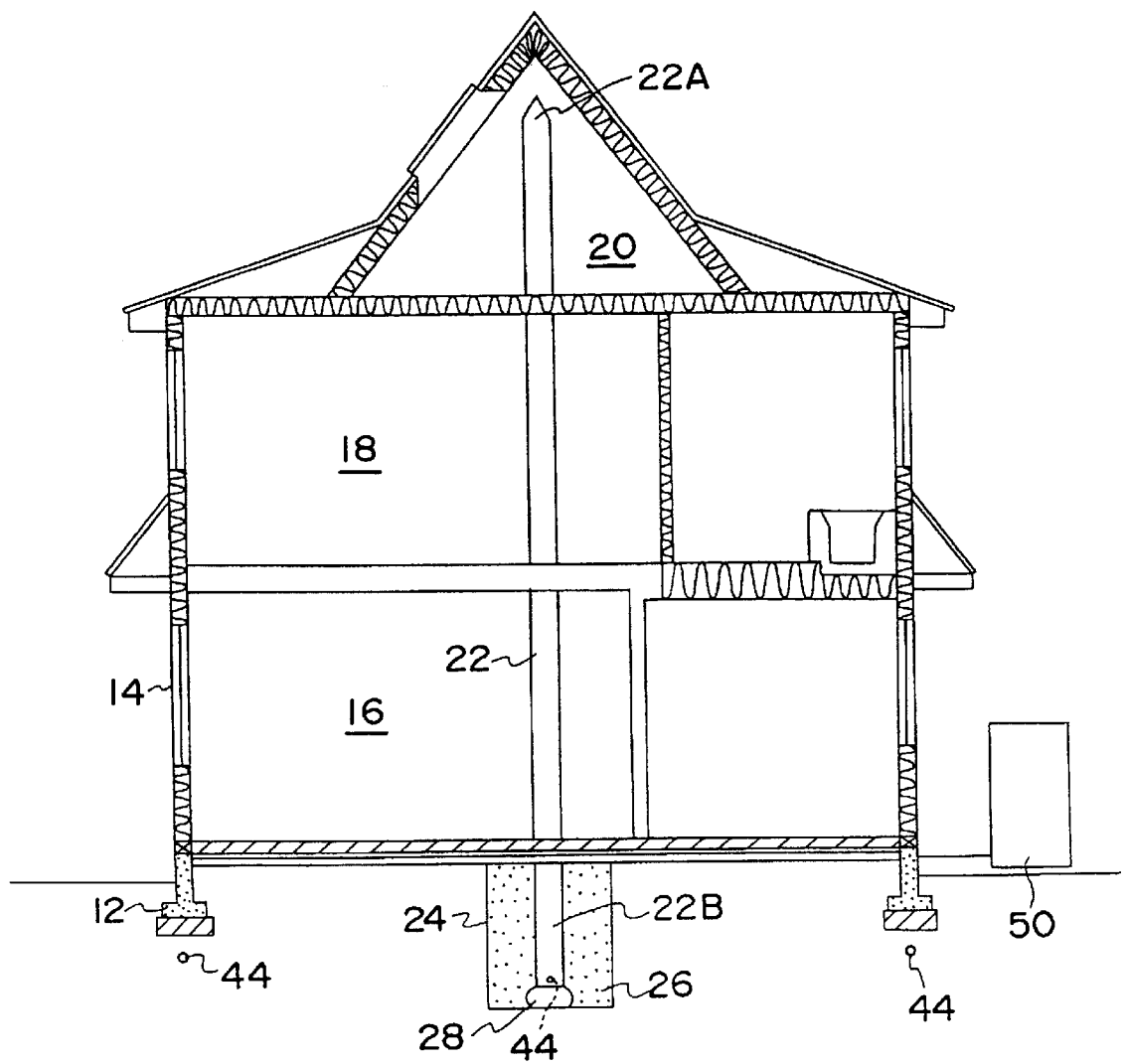
FIG. 1 is an overall structural view of a house relating to an embodiment of the present invention.

FIG. 1 is an overall structural view of a newly-constructed house relating to the present embodiment. The house is constructed by erecting the central pillar, laying the foundation, laying the dirt floor and the groundsill, installing the floor heating system, assembling the frame of the first story, assembling the floor of the second story, flooring the second story, assembling the frame of the second story, assembling the attic floor, assembling the attic gable walls, assembling the roof, laying the roof boards, and carrying out the finishing work. A 2×6 method of construction, which is an improvement over the conventional 2×4 method in terms of resistance to earthquakes and fires, is used.

The house is formed by a foundation 12 and a main body 14 built on the foundation 12. The main body 14 can be broadly divided into a first story section 16, a second story section 18, and an attic section 20.

Figure 2:
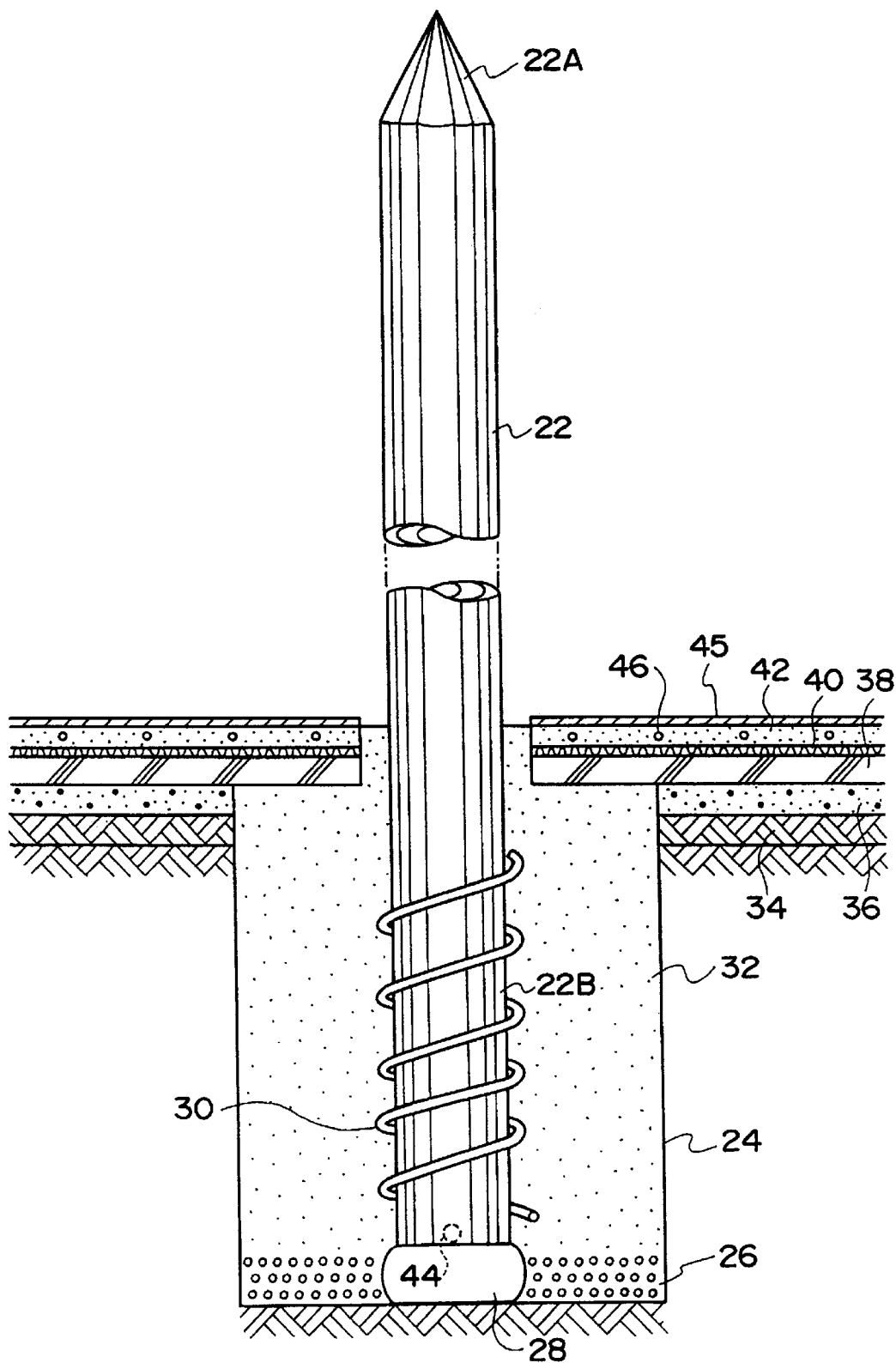
FIG. 2 is an enlarged view of main portions illustrating a structure of a lower portion of a central pillar used in the house relating to the embodiment of the present invention.
Figure 3:
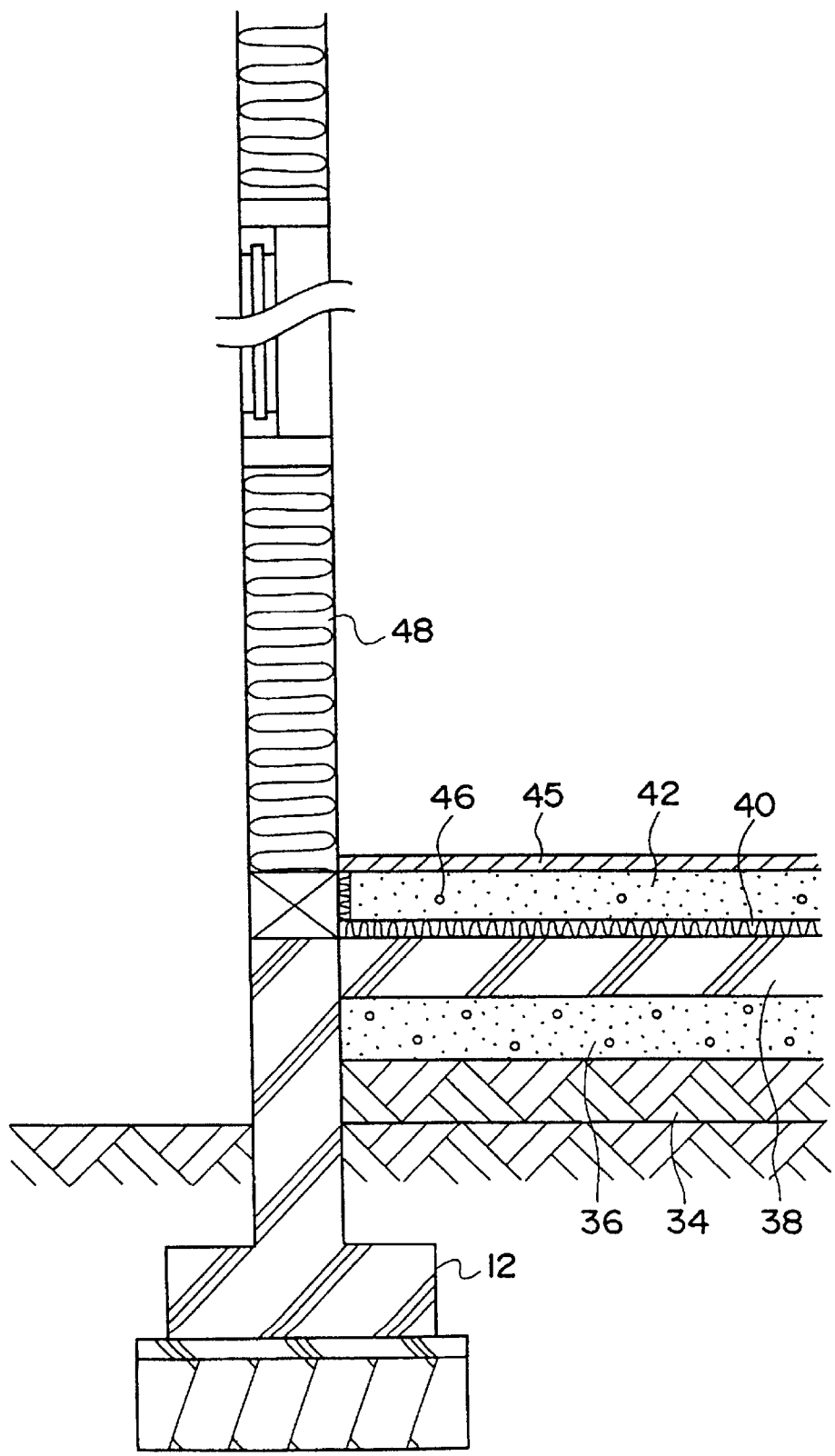
FIG. 3 is an enlarged view of a portion of a far-infrared radiation thermal storage floor heating system used in the house relating to the embodiment of the present invention.

As illustrated in FIG. 2, a hole 24, which is dug by hand and has a diameter of about 1.3 to 1.8 m and a depth of about 1.5 to 2.0 m, is dug beneath the floor of the house.

A gravel layer 26 formed by spreading gravel is formed at the bottom of the hole 24. A foundation stone 28, which is from a lake shore or a river beach for example, is placed in the central portion of the gravel layer 26.

A lower end portion 22B of a central pillar 22 made of wood is placed on the foundation stone 28 such that the central pillar 22 stands substantially vertically erect. The central pillar 22 passes through the floor portion of the substantially central portion of the main body 14, passing through the first story section 16, the second story section 18, and a part of the attic section 20 so as to extend to the inner side of the roof.

A distal end portion 22A of the central pillar 22 is worked so as to be formed in a pointed configuration. The bottom end surface of the central pillar 22 is slightly burned by a burner so as to be carbonized, and a retaining hole having a pentagonal cross-sectional configuration is formed in the bottom surface. A crystal sphere 44 having a diameter of approximately 36 mm and serving as a crystal body is placed in this retaining hole. Crystal spheres 44 are also placed beneath the four corners of the concrete foundation 12 of the house.

In the present embodiment, a Japanese cedar tree or a hinoki cypress tree about 9 m in height is used as the central pillar 22. It is preferable that the tree forming the central pillar 22 is cut from a forest having the same or similar soil as that of the ground on which the house is built.

A ceramic/carbon/bincho charcoal/gravel mixture layer 32 serving as a ceramic/carbon/gravel mixture is filled in at the periphery of the portion of the central pillar 22 which is inserted in the hole 24. Mixed together in the ceramic/carbon/bincho charcoal/gravel mixture layer 32 are bincho charcoal, gravel and a ceramic/carbon mixture in which are mixed together ceramic and carbon. The portion of the central pillar 22 inserted in the hole 24 is buried in the ceramic/carbon/bincho charcoal/gravel mixture layer 32. In this way, because the lower end portion of the central pillar 22 is buried in the ceramic/carbon/bincho charcoal/gravel mixture layer 32, the central pillar is strongly fixed mainly by the gravel in the ceramic/carbon/bincho charcoal/gravel mixture layer 32. The amount of the ceramic/carbon/bincho charcoal/gravel mixture layer 32 used per hole 24 is approximately 1.5 tons.

A hot water pipe 30 is wound around the lower end portion of the central pillar 22.

The ceramic/carbon mixture is formed by mixing a powder and particles of a carbon such as charcoal, and a powder and particles of a natural ceramic such as pumice. In the present embodiment, the ceramic/carbon mixture is formed by mixing together powdered charcoal, rough charcoal, and pumice in a 1:2:3 ratio. Powdered charcoal, rough charcoal, and pumice are all far-infrared radiation emitting materials. Bincho charcoal is preferably used as the powdered charcoal and rough charcoal.

The ceramic/carbon/bincho charcoal/gravel mixture used as the ceramic/carbon/gravel mixture in the present embodiment is formed by mixing the gravel and the ceramic/carbon mixture in a ratio of 2:3 to 1:1, e.g., about 1.5 tons of the ceramic/carbon mixture to about 1 to 1.5 tons of gravel. The mixing ratio of the ceramic/carbon mixture with respect to the gravel is adjusted in accordance with the properties of the soil at the site of construction. If the soil is strongly acidic or is very moist, the amount of the ceramic/carbon mixture which is mixed in is increased.

In this way, by manually or mechanically digging the hole 24 and filling the ceramic/carbon/bincho charcoal/gravel mixture 32 into the hole 24, soil which is polluted by drainage of water used in the house, chemicals, or the like is turned weakly alkaline and is activated due to the effect of the ceramic/carbon mixture, and the soil at the periphery of the lower end portion 22B of the central pillar 22 can be purified.

A fill layer 34 which contains a ceramic/carbon mixture is provided beneath the entire floor. A crushed stone layer 36, which is about 100 mm thick and in which a ceramic/carbon mixture and crushed stone are mixed together, is provided on top of the fill layer 34. A concrete layer 38 containing a ceramic/carbon mixture is provided on top of the crushed stone layer 36.

A thermally-insulating/moisture-proofing layer 40, which is approximately 30 mm thick and is formed from an extrusion-foamed styrene and a moisture-proofing film, is disposed on top of the concrete layer 38. A mortar layer 42 of a thickness of 60 mm or more and containing a ceramic/carbon mixture is provided on the thermally-insulating/moisture-proofing layer 40. A hot-water pipe 46 is embedded in the mortar layer 42. A finishing material 45 such as carpet, flooring, cork tiles, or the like is laid on the surface of the mortar layer 42.

A ceramic/carbon mixture is mixed in the concrete foundation 12 as well so that that the foundation 12 includes the ceramic/carbon mixture.

The amount of the ceramic/carbon mixture which is mixed in the foundation 12 and in the concrete layer 38, i.e., the amount of the ceramic/carbon mixture contained in the foundation 12 and in the concrete layer 38, is 40 kg per cubic meter, as is listed in following Table 1. The amount of the ceramic/carbon mixture mixed in the fill layer 34 and in the crushed stone layer 36 is 40 kg or more per 3.306 square meters, as listed in Table 1. Further, the mixing ratios of the carbon and the ceramic (e.g., pumice) of the ceramic/carbon mixture which is mixed in the foundation and in the respective layers are, for example, as in Table 1.

| Region | Mixing Ratio | Amount Mixed In |
| --- | --- | --- |
| fill layer | ceramic: powdered charcoal: rough charcoal = 1:2:3 | 40 kg/3.306 m² |
| crushed stone layer | ceramic: powdered charcoal: rough charcoal = 1:2:3 | 40 kg/3.306 m² |
| concrete layer | ceramic: powdered charcoal = 1:3 | 40 kg/m³ |
| mortar layer | ceramic: powdered charcoal = 1:3 | 40 kg/m³ |
| foundation | ceramic: powdered charcoal = 1:3 | 40 kg/m³ |

The single hot water pipe 46 is disposed in a zigzag manner, and communicates with the hot water pipe 30 wound around the lower end portion of the central pillar 22. Both ends of the hot-water pipe 46 are connected to a hot water supplying device 50 such as a boiler or the like, so that hot water is circulated in the hot water pipe 46. Further, a thermally-insulating material 48 approximately 150 mm thick is filled in the walls so as to further enhance the thermal insulation effect.

A heater such as an electric heater, a semiconductor heater or the like may be used in place of the hot water pipe.

The ceramic/carbon mixture has high far-infrared radiation emitting energy. Due to the emission of far-infrared radiation from beneath the floor, the moisture within the structure and within the walls of the house is removed, and condensation is prevented. Therefore, the durability of the house improves due to the moisture-proofing effect.

Further, the ceramic/carbon mixture has the effect of making weakly alkaline the soil which has been made acidic due to cement or chemicals. Therefore, this effect works together with the moisture-proofing effect to suppress the outbreak of termites and the outbreak of bacteria and fungi. In this way as well, the durability of the house can be improved.

In the present embodiment, hot water is circulated through the hot water pipe 46 by the hot water supplying device 50 so as to carry out far-infrared radiation thermal storage floor heating and so as to heat the ceramic/carbon mixture. With the central pillar 22 erect, the lower end portion 22B in which the crystal sphere 44 is disposed is buried in the ground, and the pointed distal end portion 22A is directed toward the ceiling. In a house equipped with the central pillar 22, because the lower end portion 22B of the central pillar 22 is buried in the ground and the ceramic/carbon/bincho charcoal/gravel mixture layer 32 is provided at the periphery of the lower end portion 22B, the electric potential in a vicinity of the lower end portion 22B of the central pillar 22 is high. As a result, the electrical energy in the atmosphere flows from the distal end portion 22A of the central pillar 22 toward the lower end portion 22B. Because the distal end portion 22A is pointed and the crystal sphere having the current-collecting effect is disposed in the lower end portion 22B, it is easy for the electrical energy within the atmosphere to be collected. The electrical energy reacts with the crystal spheres at the four corners of the house and spreads beneath the floor, energy is stored beneath the floor by the ceramic and the carbon, and far-infrared radiation is thereby effectively emitted.

Further, because the lower end portion 22B of the central pillar 22 is buried in the ground, the central pillar 22 is affected by the terrestrial magnetism, and the magnetic energy flows from the lower end portion 22B of the central pillar 22 toward the distal end portion 22A thereof. At this time, because the ceramic/carbon/bincho charcoal/gravel mixture layer 32 is disposed at the periphery of the lower end portion 22B of the central pillar 22, the magnetic field at the periphery of the lower end portion 22B is adjusted by the effect of the far-infrared radiation. Further, the ground, the house, and the interior environment are negatively ionized due to the electricity and the magnetic energy acting on the central pillar.

Moreover, in the present embodiment, the central pillar 22 is used in a house which is a walled structure. Therefore, the feel of a traditional Japanese building is created, and a living space with a Japanese architectural sense is provided.

In accordance with the present embodiment, the ceramic/carbon/bincho charcoal/gravel mixture layer is filled in the hole 24 in which the lower end portion 22B of the central pillar 22 is inserted. Therefore, the magnetic field is adjusted by the effect of the far-infrared radiation, and the magnetic field in a vicinity of the lower end portion 22B of the central pillar 22 can be activated. As a result, the transfer of electricity and magnetic energy can be improved.

In the above-described embodiment, the present invention is applied to a house which is a walled structure. However, the present invention is not limited to the same, and may be applied to houses or buildings of framework construction, steel-frame construction, reinforced concrete construction, or the like.

As described above, in accordance with the present embodiment, the ceramic/carbon mixture having high far-infrared radiation emitting energy is provided beneath the floor, and the ceramic/carbon mixture is included in the concrete and mortar. Therefore, persons within the house can be thoroughly warmed by the emission of negative ions and far-infrared radiation, and the heating efficiency can be improved. Moreover, far-infrared radiation is good for blood circulation, and health is thereby promoted.

The far-infrared radiation is negative and positive far-infrared radiation of oxygen and carbon, and acts more effectively on cells of persons.

Due to the far-infrared radiation, moisture within the structure and within the walls of the house can be removed and condensation can be prevented. Therefore, the durability of the house can be improved due to the moisture-proofing.

The ceramic/carbon mixture has the effect of changing to weakly alkaline the soil which has been made acidic by cement or chemicals. This effect works together with the moisture-proofing effect to prevent the outbreak of bacteria and the outbreak of termites which are a cause of decay of houses.

Further, due to the moisture removing effect of the ceramic/carbon mixture, penetration of moisture into the living space is prevented. This effect combined with the effects of the negative ions and the far-infrared radiation promotes the health of the occupants.

What is claimed is:

1. A method of building a building comprising:
   digging a hole under a site of said building;
   placing a pillar made of wood with a tapered distal end portion into said hole, wherein a proximal portion of said pillar is placed in said hole;
   inserting a crystal sphere into the proximal portion of said pillar made of wood;
   placing a ceramic/carbon/gravel mixture around the proximal portion of said pillar made of wood;
   placing a floor member above said ceramic/carbon/gravel mixture, wherein said floor member comprises a ceramic/carbon mixture;

placing a heat source for heating said floor member and said ceramic/carbon/gravel mixture at a periphery of the proximal portion of said pillar made of wood; and erecting a building on top of said floor member.

2. A building comprising:

a pillar made of wood whose distal end portion is tapered and whose lower end portion is buried in the ground;

a crystal sphere inserted in the lower end portion of said pillar;

a ceramic/carbon/gravel mixture which is formed by mixing ceramic, carbon and gravel together and which is provided at the periphery of the lower end portion of said pillar;

a floor member containing a ceramic/carbon mixture in which ceramic and carbon are mixed together; and a heat source for heating said floor member and said ceramic/carbon/gravel mixture which is provided at the periphery of the lower end portion of said pillar.

3. A building according to claim 2, wherein said floor member is formed by a fill layer, a crushed stone layer provided on the fill layer, a slab-on-earth layer provided on the crushed stone layer, and a mortar layer provided on the slab-on-earth layer.

4. A building according to claim 2, wherein said heat source is one of a heater and hot water circulating through a pipe.

5. A building according to claim 3, wherein said heat source is one of a heater and hot water circulating through a pipe.

6. A far-infrared radiation thermal storage floor heating system comprising:

a floor member containing a ceramic/carbon mixture in which ceramic and carbon are mixed together; and a heat source embedded in said floor member.

7. A far-infrared radiation thermal storage floor heating system according to claim 6, wherein said floor member is formed by a fill layer, a crushed stone layer provided on the fill layer, a slab-on-earth layer provided on the crushed stone layer, and a mortar layer provided on the slab-on-earth layer.

8. A far-infrared radiation thermal storage floor heating system according to claim 6, wherein said heat source is one of a heater and hot water circulating in a pipe embedded in said floor member.

9. A far-infrared radiation thermal storage floor heating system according to claim 7, wherein said heat source is one of a heater and hot water circulating in a pipe embedded in said floor member.

* * * * *

UNITED STATES PATENT AND TRADEMARK OFFICE
CERTIFICATE OF CORRECTION

PATENT NO.    : 6,195,954 B1
DATED         : March 6, 2001
INVENTOR(S)   : Isamu Maeda It is certified that error appears in the above-identified patent and that said Letters Patent is hereby corrected as shown below:

<u>Title page,</u>
Item [73], change the name of the Assignee from "Scandanavia Home Co. Ltd." to -- Scandinavia Home Co., Ltd. --

Signed and Sealed this

Seventh Day of May, 2002

*Attest:*

*Attesting Officer*

JAMES E. ROGAN
*Director of the United States Patent and Trademark Office*